(12) United States Patent
Mo et al.

(10) Patent No.: US 7,133,403 B1
(45) Date of Patent: Nov. 7, 2006

(54) TRANSPORT NETWORK AND METHOD

(75) Inventors: Li Mo, Plano, TX (US); David W. Wynn, Garland, TX (US); George E. Bucklin, McKinney, TX (US); Edward T. Sullivan, Highland Village, TX (US); Francois Moore, McKinney, TX (US); Abed Mohd Jaber, Plano, TX (US); Edward Alton Harbin, Dallas, TX (US); Nimer Ibrahim Yaseen, Allen, TX (US); Snigdho C. Bardalai, Plano, TX (US); David W. Terwilliger, Dallas, TX (US); Michael J. Mezeul, Allen, TX (US); Kai Chung Ko, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 09/588,806

(22) Filed: Jun. 6, 2000

Related U.S. Application Data

(60) Provisional application No. 60/202,190, filed on May 5, 2000.

(51) Int. Cl.
*H04L 12/28* (2006.01)
*H04L 12/56* (2006.01)

(52) U.S. Cl. ..................................... 370/390
(58) Field of Classification Search ................ 370/351, 370/389, 390, 400, 401, 395.1, 395.5, 395.53
See application file for complete search history.

(56) References Cited

U.S. PATENT DOCUMENTS

| | | | |
|---|---|---|---|
| 5,229,990 A | 7/1993 | Teraslinna | 370/218 |
| 5,231,633 A | 7/1993 | Hluchyj et al. | 370/429 |
| 5,461,624 A | 10/1995 | Mazzola | 370/402 |
| 5,590,133 A | 12/1996 | Billström et al. | 370/349 |
| 5,684,800 A * | 11/1997 | Dobbins et al. | 370/401 |
| 5,771,370 A | 6/1998 | Klein | 703/13 |
| 5,781,534 A | 7/1998 | Perlman et al. | 370/248 |
| 5,818,842 A | 10/1998 | Burwell et al. | 370/397 |
| 5,825,772 A | 10/1998 | Dobbins et al. | 370/396 |
| 5,850,399 A | 12/1998 | Ganmukhi et al. | 370/412 |
| 5,852,606 A | 12/1998 | Prince et al. | 370/393 |
| 5,892,912 A * | 4/1999 | Suzuki et al. | 370/395.53 |
| 5,946,308 A | 8/1999 | Dobbins et al. | 370/392 |
| 5,956,341 A | 9/1999 | Galand et al. | 370/412 |
| 6,018,766 A | 1/2000 | Samuel et al. | 709/218 |
| 6,028,842 A | 2/2000 | Chapman et al. | 370/235 |
| 6,058,113 A | 5/2000 | Chang | 370/390 |
| 6,075,767 A | 6/2000 | Sakamoto et al. | 370/228 |

(Continued)

FOREIGN PATENT DOCUMENTS

EP 0 512 495 A2 11/1992

(Continued)

OTHER PUBLICATIONS

International Search Report in International Application No. PCT/US 01/13723, dated Oct. 31, 2001, 7 pages.

(Continued)

*Primary Examiner*—Kevin C. Harper
(74) *Attorney, Agent, or Firm*—Baker Botts L.L.P.

(57) ABSTRACT

A transport network includes a flexible topology for internally defining transport elements. The transport elements each include a port group having a plurality of geographically distributed ports from the transport network. Point-to-multipoint connectivity is defined between the ports in a port group. An identifier represents the port group as a single element to internal and/or external elements for protocol exchanges.

28 Claims, 9 Drawing Sheets

U.S. PATENT DOCUMENTS

| | | | |
|---|---|---|---|
| 6,205,158 B1 | 3/2001 | Martin et al. | 370/541 |
| 6,216,167 B1* | 4/2001 | Momirov | 709/238 |
| 6,317,426 B1 | 11/2001 | Afanador et al. | 370/352 |
| 6,331,905 B1 | 12/2001 | Ellinas et al. | 398/2 |
| 6,331,985 B1* | 12/2001 | Coden | 370/403 |
| 6,353,593 B1 | 3/2002 | Chen et al. | 370/216 |
| 6,353,616 B1 | 3/2002 | Elwalid et al. | 370/443 |
| 6,359,857 B1 | 3/2002 | Ahmad et al. | 370/217 |
| 6,366,556 B1 | 4/2002 | Ballintine et al. | 370/216 |
| 6,515,966 B1 | 2/2003 | Bardalai et al. | 370/236 |
| 6,577,634 B1* | 6/2003 | Tsukakoshi et al. | 370/395.31 |
| 2001/0025310 A1 | 9/2001 | Krishnamurthy et al. | 709/223 |

FOREIGN PATENT DOCUMENTS

| | | |
|---|---|---|
| EP | 0 849 970 A2 | 6/1998 |
| EP | 0 959 641 A1 | 11/1999 |
| WO | WO 97/40610 | 10/1997 |
| WO | WO 98/00954 | 1/1998 |
| WO | WO 99/11090 | 3/1999 |
| WO | WO 99/66675 | 12/1999 |
| WO | WO 00/10357 | 2/2000 |
| WO | WO 00/21254 | 4/2000 |
| WO | WO 00/24164 | 4/2000 |

OTHER PUBLICATIONS

International Search Report in International Application No. PCT/US 01/13725, dated Oct. 31, 2001, 6 pages.
International Search Report in International Application No. PCT/US 01/14624, dated Nov. 6, 2001, 6 pages.
PCT Invitation to Pay Additional Fees in International Application No. PCT/US 01/13732, dated Nov. 7, 2001, 4 pages.
Tsong-Ho Wu, "A Passive Protected Self-Healing Mesh Network Architecture and Applications," XP 000446089, *IEEE/ACM Transactions on Networking*, Feb. 1994, 13 pages.
PCT International Search Report in International Application No. PCT/US 01/13695, dated Oct. 9, 2001, 6 pages.
PCT International Search Report No. PCT/US01/13724, dated Nov. 30, 2001, 6 pages.
Birman A et al.: "Support for RSVP-Based Services Over ATM Networks," Communications: The Key to Global Prosperity. Globecom 1996. Global Internet 96 Conference Record. London, Nov. 18-22, 1996, Global Telecommunications Conference (Globecom, New York, IEEE, US, vol. SUPP, Nov. 18, 1996, pp. 10-15, XP000741665 ISBN: 0-7803-3337-3.
Sharma et al.: "Scalable timers for soft state protocols," Infocom '97, Sixteenth Annual Joint Conference of the IEEE Computer and Communications Societies, Driving the Information Revolution., Proceedings IEEE Kobe, Japan Apr. 7-11, 1997, Los Alamitos, CA USA, IEEE Comptu. Soc. US Apr. 7, 1997, pp. 222-229, XP010252006, ISBN: 0-8186-7780-5.
International Search Report in International Application. No. PCT/US01/14626, dated Feb. 5, 2002, 7 pages.
International Search Report in International Application No. PCT/US01/14622, dated Feb. 14, 2002, 7 pages.
Pancha P: "ATM Switch Routers for Combined Connection-Oriented and Connectionless Transport," ISS '97, World Telecommunications Congress. (Int'l Switching Symposium). Global Network Evolution: Convergence or Collision? Toronto, Sep. 21-26, 1997, ISS. World Telecommunications Congress. (International Switching Symposium).
Mysore J. P. et al.: "Performance of transport protocols over a multicasting-based architecture fr Internet host mobility" Communications, 1998. ICC 98. Conference Record. 1998 IEEE International Conference on Atlanta, GA, USA Jun. 7-11, 1998, New York, NY, USA, IEEE, US, Jun. 7, 1998, pp. 1817-1823, XP010284635, ISBN: 0-7803-4788-9.
Bar-Noy A. et al.: "Topology Distribution Cost Vs. Efficient Routing in Large Networks," Computer Communications Review, Association for Computing Machinery, New York, US, vol. 20, No. 4, Sep. 1, 1990, pp. 242-252, XP000168058; ISSN: 0146-4833, whole document.
International Search Report in International Application No. PCT/US01/13694, dated Mar. 12, 2002, 7 pgs.
Fritz J: "Bullet Proofing ATM: Part I," Byte, McGraw-Hill Inc. St. Peterborough, US, vol. 22, No. 6, Jun. 1, 1997, pp. 59-60, XP000691556, ISSN: 0360-5280, p. 60.
Sun H. et al.: "Supporting IP on the ATM networks: an overview," Computer Communications, Elsevier Science Publishers BV, Amsterdam, NL, vol. 21, No. 11, Aug. 10, 1998, pp. 1020-1029, XP004138773, ISSN: 0140-3664, whole document.
Law A M et al: "Simulation Software for Communications Networks: The State of the Art," IEEE Communications Magazine, IEEE Service Center. Piscataway, N.J., US, vol. 32, No. 3, Mar. 1, 1994, p. 1, col. 2, line 4-p. 2, col. 1, line 39, p. 4, col. 1, line 3-p. 6, col. 1, paragraph 6; XP 000442186.
International Search Report in International Application No. PCT/US01/14615, dated Apr. 5, 2002, 7 pages.
International Preliminary Examination Report in International Application No. PCT/US01/13725, dated Jun. 4, 2002, 5 pages.
International Preliminary Examination Report in International Application No. PCT/US01/13732, dated Jul. 12, 2002, 5 pages.
International Preliminary Examination report in International Application No. PCT/US01/13695, dated Oct. 30, 2002, 4 pages.
Form PCT/IPEA/416, *Notification of Transmittal of International Preliminary Examination Report*, with attached Form PCT/IPEA/409, *PCT International Preliminary Examination Report* (5 pages), PCT/US01/13694 dated Mar. 19, 2003.
Kermani, et al., "*Virtual Cut-through: A New Computer Communication Switching Technique*", Computer Networks, vol. 3, Cover, Table of Contents and pp. 267-285, 1979.
Cidon, et al., "*MetaRing—A Full Duplex Ring with Fairness and Spatial Reuse*", IEEE Transactions on Communications, vol. 41, Cover and pp. 110-120, Jan. 1993.
Ofek, et al., "*METANET: Principles of an Arbitrary Topology LAN*", IEEE Transactions on Networking, vol. 3, No. 2, Cover and pp. 169-180, Apr. 1995.
West, "*Introduction to Graph Theory*", Prentice Hall, ISBN 0-13-227828-6, QA166.W43 1996, 7 pages Cover, ISBN page, Table of Contents, and pp. 51-85.
Hunter, et al., "*WASPNET: A Wavelength Switched Packet Network*", IEEE Communications Magazine, 2 page cover and pp. 120-129, Mar. 1999.
Hernandez-Valencia, "*A Simple Data Link (SDL) Framing Protocol for High-Speed Optical Packet Networks*", OIF99.043.0, pp. 1-21, May 4, 1999.
Simpson, "*The Point-to-Point Protocol (PPP)*", Daydreamer, RFC-1661, 50 pages, Jul. 1994.
Katz, et al., "*Traffic Engineering Extensions to OSPF*", IETF Draft, draft-katz-yeung-ospf-traffic-01.txt, pp. 1-8, Oct. 1999.
Crawley, et al., "*A Framework for Qos Based Routing in the Internet*", RFC 2386, 35 pages, Aug. 1998.
Wimer, et al., FORE Systems, Inc., "*OSPF Sub-Areas*", IETF Draft, draft-wimer-ospf-sub-areas-00.txt, 13 pages, Oct. 1999.
Wimer, et al., FORE Systems, Inc., "*Additional OSPF Extensions for Traffic Engineering and Qos Routing*", IETF Draft, draft-wimer-ospf-traffic-00 txt, 5 pages. Feb. 1999.
Yeung, "*OSPF Extensions for Traffic Engineering*", IETF Draft, draft-yeung-ospf-traffic-00.txt, 9 pages, Feb. 1999.
Apostolopoulos, et al., "*Qos Routing Mechanism and OSPF Extensions*", RFC 2676, 47 pages, Aug. 1998.
Smit, et al., "*IS-IS Extensions for Traffic Engineering*", IETF Draft, draft-ietf-isis-traffic-00.txt, 10 pages, May 1999.
Awduche, et al., UUNET (MCI WorldCom), "*Requirements for Traffic Engineering Over MPLS*", RFC 2702, 28 pages, Sep. 1999.
Blake, et al., "*An Architecture for Differentiated Services*", RFC 2475, 34 pages, Dec. 1998.
Braden, et al., "*Resource ReSerVation Protocol (RSVP)*", Version 1 Functional Specification, RFC 2205, 105 pages, Sep. 1997.
Wroclawski, "*Specification of the Controlled-Load Network Element Service*"RFC 2211, 18 pages, Sep. 1997.

Shenker, et al., "*Specification of Guaranteed Quality of Service*", RFC 2212, 19 pages, Sep. 1997.
Reynolds, et al., ISI, "*Assigned Numbers*", RFC 1700, 215 pages, Oct. 1994.
Jacobson, et al., "*An Expedited Fowarding PHB*", RFC 2598, 11 pages, Jun. 1999.
Heinanen, et al., "*Assured Forwarding PHB Group*", RFC 2597, 11 pages, Jun. 1999.
Manchester, et al., Bell Laboratories, "*IP over SONET*", IEEE Communications Magazine, vol. 36, No. 5, cover and pp. 136-142, May 1998.
Heinanen, Telecom Finland "*Multi-Protocol Encapsulation over ATM Adaptation Layer 5*", RFC 1483, 15 pages, Jul. 1993.
The ATM Forum, Technical Committee, "*Private Network-Network Interface Specification Version 1.0*", afpnni-0055.000, cover, introduction, acknowledgements and table of contents (18 pages) and 366 pages of text, Mar. 1996.
Callon, Digital Equipment Corporation, "*Use of OSI IS-IS for Routing in TCP/IP and Dual Environments*", RFC 1195, 80 pages, Dec. 1990.
Moy, Ascend Communications "*OSPF Version 2*", RFC 2328, 204 pages, Apr. 1998.
Malkin, Bay Networks, "*RIP Version 2*", RFC 2453, 37 pages, Nov. 1998.
Rekhter, et al., "*A Border Gateway Protocol 4 (BGP-4)*", RFC 1771, 54 pages, Mar. 1995.
Goguen, et al., "*RSVP Label Allocation for Backup Tunnels*", draft-swallow-rsvp-bypass-label-00.txt, IETF Document, 10 pages, Oct. 1999.
Callon, et al., "*A Framework for MPLS*", draft-ietf-mpls-framework-05.txt, IETF document, 69 pages, Sep. 1999.
Rosen, et al., "*Multiprotocol Label Switching Architecture*", draft-ietf-mpls-arch-06.txt, IETF Document, 62 pages, Feb. 1999.
Rosen, et al., "*MPLS Label Stack Encoding*", IETF document, draft-ietf-mpls-label-encaps-07.txt, 22 pages, Sep. 1999.
Andersson, et al., "*LDP Specification*", IETF document, draft-ietf-mpls-ldp-06.txt, 124 pages, Oct. 1999.
Jamoussi, Nortel Networks Corp., "*Constraint-Based LSP Setup Using LDP*", draft-ietf-mpls-cr-ldp-03.txt, IETF Document, pp. 1-39, Sep. 1999.
Guerin, "*Qos Routing in Networks with Inaccurate Information: Theory and Algorithms*", IEEE/ACM Transactions on Networking, vol. 7, No. 3, cover and pp. 350-364, Jun. 1999.
Parekh, et al., "*A Generalized Processor Sharing Approach to Flow Control in Integrated Services Networks: The Single Node Case*", IEEE Transactions on Networking, vol. 1, No. 3, cover and pp. 344-357, Jun. 1993.
Parekh, et al., "*A Generalized Processor Sharing Approach to Flow Control in Integrated Services Networks: The Multiple Node Case*", IEEE Transactions on Networking, vol. 2, No 2, cover and pp. 137-150, Apr. 1994.
Golestani, "*A Self-Clocked Fair Queuing Scheme for Broadband Applications*", Proceedings of IEEE Infocom '94, Toronto, Ontario, Canada, cover and pp. 636-646, Jun. 1994.
Zhang, "*Virtual Clock: A New Traffic Control Algorithm for Packet Switching Networks*", ACM SIGCOMM Computer Communication Reviews, vol. 20, No. 4, pp. 19-29, Sep. 1990.
Ferrari, et al., "*A Scheme for Real-Time Channel Establishment in Wide-Area Networks*", IEEE Jorunal on Selected Areas in Communications, vol. 8, No. 3, cover and pp. 368-379, Apr. 1990.
Wrege, et al., "*A Near-Optimal Packet Scheduler for QoS Networks*", Proceedings of IEEE Infocom '97, Kobe, Japan, cover and pp. 576-583, Apr. 7-12, 1997.
Golestani, "*A Stop-and-Go Queuing Framework for Congestion Management*", ACM SIGCOMM Computer Communications Review, vol. 20, No. 4, pp. 8-18, Sep. 1990.
Kalmanek, et al., "*Rate Controllers Servers for Very High-Speed Networks*", Proceedings of IEEE Globecom '90, San Diego, CA, Conference Record vol. 1 of 3, cover and pp. 300.3.1-300.3.9, Dec. 2-5, 1990.
Sriram, K., "*Methodologies for Bandwidth Allocation, Transmission, Scheduling and Congestion Avoidance in Broadband ATM Networks*", Proceedings of IEEE Globecom, '92, Orlando, FL, Conference Record vol. 3 of 3, cover and pp. 1545-1551, Dec. 6-9, 1992.
Jacobson, et al., "*Random Early Detection Gateways for Congestion Avoidance*", ACM/IEEE Transactions on Networking, vol. 1, No. 4, cover and pp. 397-413, Aug. 1993.
Braden, et al., "*Recommendations on Queue Management and Congestion Avoidance in the Internet*", RFC 2309, 16 pages, Apr. 1998.
Jacobson, "*Notes on Using RED for Queue Management and Congestion Avoidance*", Network Research Group, Berkeley National Laboratory, Berkeley, CA, NANOG 13, Dearborn, MI, cover and 15 pages, Jun. 8, 1998.
May, et al., "*Analytic Evaluation of RED Performance*", pp. 1-10, Jun. 1998.
May, et al., "*Reasons Not To Deploy RED*", pp. 1-5, May 1999.
Lakshman, et al., "*SRED: Stabilized RED*", pp. 1-10, Mar. 1999.
Feng, et al., "*BLUE: A New Class of Active Queue Management Algorithms*", pp. 1-27, Mar. 1999.
Cisco's "*Distributed Weighted Random Early Detection*", Source=http://www.cisco.com/univercdcc/td/doc/product/software/ios111/cc111/wred.htm#xtocid236360, 17 pages, Feb. 9, 1998.
J. Wroclawski, MIT LCS "*The Use of RSVP with IETF Integrated Services*", RFC 2210, 31 pages, Sep. 1997.
Shenker, et al., "*General Characterization Parameters for Integrated Service Network Elements*", RFC 2215, 15 pages, Sep. 1997.
Braden, et al., "*RAPI—An RSVP Application Programming Interface, Version 5*", Internet Draft, 25 pages, Aug. 11, 1998.
Katsube, et al., "*Toshiba's Router Architecture Extensions for ATM: Overview*", RFC 2098, 17 pages, Feb. 1997.
Rekhter, et al., "*Cisco Systems' Tag Switching Architecture Overview*", RFC 2105, 13 pages, Feb. 1997.
Viswanathan, et al., "*ARIS: Aggregate Route-Based IP Switching*", Internet draft, 19 pages, Mar. 1997.
Newman, et al., "*Ipsilon Flow Management Protocol Specification for IPv4 Version 1.0*", RFC 1953, 19 pages, May 1996.
Davie, et al., "*Switching in IP Networks*", ISBN 1-558650-505-3, TK5105.875.157,D38, Morgan Kaufmann Publishers, Inc., San Francisco, CA, 8 pgs. cover, ISBN page, table of contents, pp. 27-55, 117-154, 219-232, 1998.
Moy, Proteon, Inc., "*OSPF Version 2*", RFC 1583, 202 pages, Mar. 1994.
Fuller, et al., "*Classless Inter-Domain Routing (CIDR): An Address Assignment and Aggregation Strategy*", RFC 1519, 23 pages, Sep. 1993.
Dumortier, "*Toward a New IP over ATM Routing Paradigm*", IEEE Communications Magazine, 2-pages cover and pp. 82-86, Jan. 1998.
White, et al., "*ATM Switching and IP Routing Integration: The Next Stage in Internet Evolution?*", IEEE Communications Magazine, 2-page cover and pp. 79-83, Apr. 1998.
Viswanathan, et al., "*Evolution of Multiprotocol Label Switching*", IEEE Communications Magazine, 2-page cover and pp. 165-173, May 1998.
Laubach, "*Classical IP and ARP over ATM*", RFC 1577, 16 pages, Jan. 1993.
Callon, et al., "*A Framework for Multiprotocol Label Switching*", Internet-Draft, 65 pages, Nov. 1997.
Schmidt, et al., "*Multiprotocol over ATM—Building State of the Art ATM Intranets*", Manning Publications Co., ISBN 1-884777-42-2, TK5105.875.16S36, 8 pgs. cover, ISBN page, table of contents, and pp. 207-289, 1998.
Halabi, "*Internet Routing Architecture*", Cisco Systems, New Riders, Cisco Press, 6 pgs. cover, ISBN page table of contents, and pp. 87-190, 1997.
Finn, et al., "*LAN Emulation over ATM Version 2.0- LUNI Specification*", The ATM Forum Technical Committee, AF-LANE-0084.000, 153 pages, Jul. 1997.
Alexander, et al., "*Multi-Protocol over ATM Version 1.0*", AF-MPOA-0087.000, The ATM Forum Technical Committee, 154 pages, Jul. 1997.
Deering, Stanford Unviversity, "*Host Extensions for IP Multicasting*", STD 5, RFC 1112, 16 pages, Aug. 1989.

Sahinoglu, et al., "*On Multimedia Networks: Self-Similar Traffic and Network Performance*", IEEE Communications Magazine, vol. 37, No. 1, cover and pp. 48-52, Jan. 1999.

Fishburn, et al., "*Dynamic Behavior of Differential Pricing and Quality of Service Options for the Internet*", Proc. First Inter. Conf. on Information and Computation Economics (ICE-98), ACM Press, 1998, pp. 128-139.

Steinmetz, et al., "*Multimedia: Comuting Communications and Applications*", Prentice Hall, ISBN 0-13-324435-0, QA76.575.S73, cover, acknowledgement page, LOC page, Index (15 pgs) and pp. 420-450, 1995.

Gale, et al., "*College Admissions and the Stability of Marriage*", The American Mathematical Monthly, vol. 69, No. 1, cover and pp. 9-15, 1962.

McKeown, "*Scheduling Algorithms for Input-Queued Cell Switches*", Ph.D. Thesis, Univ. of California at Berkeley, UMI No. 9602658, 12 pages cover, introduction, acknowledgement and index pages, 119 pages text, 1995.

Simpson, Daydreamer, "*PPP over SONET/SDH*", RFC 1619, 6 pages, May 1994.

Simpson, Daydreamer, "*Point-to-Point Protocol (PPP)*", RFC 1661, 50 pages, Jul. 1994.

Simpson, Daydreamer, "*PPP in HDLC-Like Framing*", RFC 1662, 24 pages, Jul. 1994.

McCloghrie, et al., "*Management Information Base for Network Management of TCP/IP-Based Internets: MIB-II*", RFC 1213, 66 pages, Mar. 26, 1991.

Baker, et al., Cisco Systems, "*OSPF Version 2 Management Information Base*", RFC 1850, 75 pages, Nov. 1995.

Baker, et al., Cisco Systems, "*RSVP Management Information Base Using SMIv2*", RFC 2206, 60 pages, Sep. 1997.

Kastenholz, RTP Software, Inc., "*The Definitions of Managed Objects for the Link Control Protocol of the Point-to-Point Protocol*", RFC 1471, 24 pages, Jun. 1993.

Kastenholz, FTP Software, Inc., "*The Definitions of Managed Objects for the IP Network Control Protocol of the Point-to-Point Protocol*", RFC 1473, 10 pages, Jun. 1993.

Baker, Cisco Systems, "*IP Forwarding Table MIB*", RFC 2096, 20 pages, Jan. 1997.

Awduche, et al., draft-ietf-tweg-framework-01.txt (IETF), "*A Framework for Internet Traffic Engineering*", 63 pages, Jul. 2000.

U.S. Appl. No. 09/588,634, entitled "*Method and System for Providing a Protection Path for Connection-Oriented Signals in a Telecommunications Network*", inventors Mo, et al., 32 pages specification, claims and abstract and 3 pages of drawings, filed Jun. 6, 2000.

U.S. Appl. No. 09/589,038, entitled "*Method and System for Providing a Protection Path for Connectionless Signals in a Telecommunications Network*", inventors Mo, et al., 38 pages specification, claims and abstract and 9 pages of drawings, filed Jun. 6, 2000.

U.S. Appl. No. 09/588,636, entitled "*Method and System for Transporting Traffic in a Packet-Switched Network*", inventors Mo, et al., 32 pages specification, claims and abstract and 6 pages of drawings, filed Jun. 6, 2000.

U.S. Appl. No. 09/588,632, entitled "*System and Method Connectionless/Connection Oriented Signal Transport*", inventors Mo, et al., 44 pages specification, claims and abstract and 7 pages of drawings, filed Jun. 6, 2000.

U.S. Appl. No. 09/848,994, entitled "*Method and System for Quality of Services (QoS) Support in a Packet-Switched Network*", inventors Li Mo, et al., 35 pages specification, claims and abstract and 6 pages of drawings, filed May 4, 2001.

U.S. Appl. No. 09/848,871, entitled "*Method and System for Modeling and Advertising Asymmetric Topology of a Node in a Transport Network*", inventors Jaber, et al., 35 pages specification, claims and abstract and 10 pages of drawings, filed May 4, 2001.

U.S. Appl. No. 09/849,003, entitled "*Unique Address Space and Method for a Transport Network*", inventor Edwin Alton Harbin, 36 pages specification, claims and abstract and 10 pages of drawings, filed May 4, 2001.

U.S. Appl. No. 09/849,010, entitled "*Method and System for Hardware Simulation*", inventors Richard L. Klevans, et al., 28 pages specification, claims and abstract and 7 pages of drawings, filed May 4, 2001.

\* cited by examiner

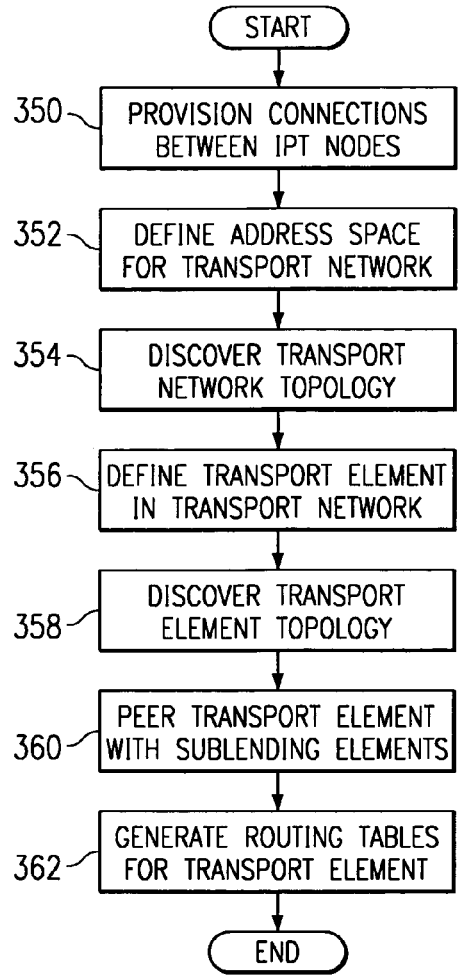
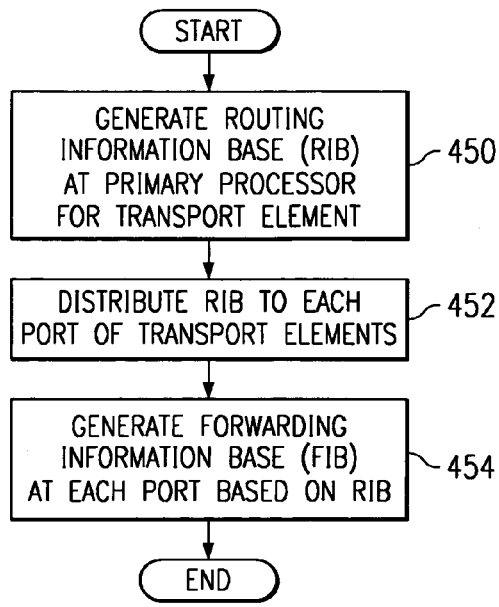
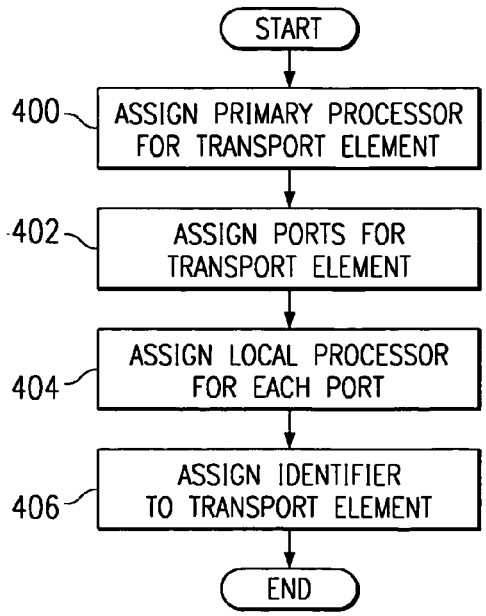
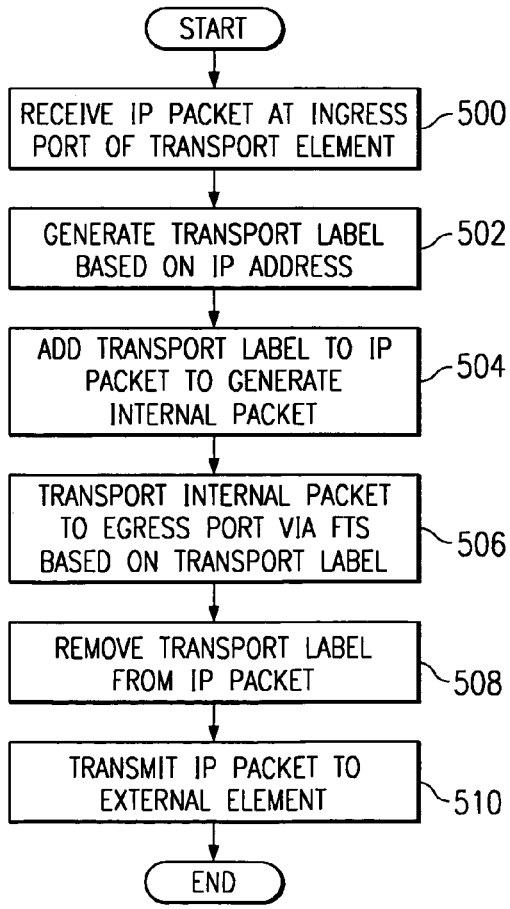

TRANSPORT NETWORK AND METHOD

RELATED APPLICATIONS

This application claims the benefit of U.S. Provisional Application Ser. No. 60/202,190, entitled INTERNET PROTOCOL TRANSPORT, filed May 5, 2000 which is hereby incorporated by reference.

TECHNICAL FIELD OF THE INVENTION

The present invention relates generally to the field of telecommunication networks, and more particularly to a transport network and method.

BACKGROUND OF THE INVENTION

Telecommunication networks transport voice and data according to a variety of standards and using a variety of technologies. Circuit-switch networks such as plain old telephone service (POTS) utilize transmission paths dedicated to specific users for the duration of a call and employ continuous, fixed-bandwidth transmission. Packet-switch networks (PSNs) allow dynamic bandwidth, depending on the application, and can be divided into connectionless networks with no dedicated paths and connection-oriented networks with virtual circuits having dedicated bandwidth along a predetermined path. Because packet-switched networks allow traffic from multiple users to share communication links, these networks utilize available bandwidth more efficiently than circuit-switched networks.

Internet protocol (IP) networks are connectionless packet-switched networks. IP networks transport information by breaking up bitstreams into addressable digital packets. Each IP packet includes source and destination addresses and can take any available route between the source and the destination. The IP packets are transmitted independently and then reassembled in the correct sequence at the destination.

Traditional IP networks employ synchronous optical network (SONET) or other time division multiplex (TDM) links that support only point-to-point connectivity across the network. Consequently, excessive channelization is required on physical ports of the IP network for point-to-multipoint data flows. This leads to greater cost in terms of support and equipment both in the network and in subtending network elements. In addition, the number of peering sessions required for subtending routers is significantly increased.

SUMMARY OF THE INVENTION

The present invention provides a transport network and method that substantially eliminate or reduce the problems and disadvantages associated with previous systems and methods. In particular, the transport network provides a flexible topology of ports that are internally configurable into port groups that each act as a single entity and provide point-to-multipoint connectivity between external elements.

In accordance with one embodiment of the present invention, a transport element defined in the transport network includes a port group having a plurality of geographically distributed ports. Point-to-multipoint connectivity is provided between the ports. An identifier is operable to represent the port group as a single element to disparate elements.

More specifically, in accordance with a particular embodiment of the present invention, the identifier is operable to represent the port group as a single element to an external node outside of the transport network. In this and other embodiments, the transport element is operable to participate with the external node in protocol exchanges. The transport element may be a transport router, transport Ethernet switch, transport Frame Relay switch or other suitable element providing point-to-multipoint connectivity between a plurality of external ports.

In another embodiment, routing information for the transport element is generated at a centralized location and distributed to the ports for traffic routing. The routing information may comprise a routing information base (RIB). In this embodiment, the RIB is distributed to each of the ports, which each generate a forwarding information base (FIB) for the port based on the RIB. To provide a secure data flow in the transport element, the RIB is distributed only to network ports that are part of the port group for the transport element.

In accordance with another aspect of the present invention a node for the transport network includes a first port, a second port, and a processing system. The first and second port each include a receive-transmit pair (RTP) of interfaces. The RTP includes a high-speed demultiplexer operable to process ingress traffic, a high-speed multiplexer operable to process egress traffic, and an external network interface. The processing system is operable to store a first routing model for a first port group including the first port and at least one geographically distributed port. The processing system is also operable to store a second routing model for a second port group including the second port and at least one geographically distributed port. The first port is configurable to process traffic based on the first routing model and the second port is configurable to process traffic based on the second routing model. For security, each port is only allowed access to its own routing model.

In still another aspect of the present invention, a transport element is provisioned by defining at least one port group from a plurality of geographically distributed nodes in the transport network. Point-to-multipoint connectivity is defined between the ports of the port group. The port group is represented as a single entity to an external network for protocol exchanges and traffic processing.

Technical advantages of the present invention include providing an improved transport network. In particular, the transport network provides a flexible topology in which sets of ports may be grouped in any suitable way and treated as a single element. As a result, provisioning of transport elements in the network is unconstrained with mesh and partial-mesh topologies supported. This allows a network owner to freely provision the network to meet customer demands and to optimize efficiency in the network.

Another technical advantage of the present invention includes providing an improved external representation for the transport network. In particular, the transport network is represented as sets of port groups with internally managed connectivity. Port groups are internally defined and each represented as a single entity providing connectivity through the transport network. Accordingly, the external network treats the transport network as a set of distinct elements.

Still another technical advantage of the present invention includes providing an improved transport element for the transport network. In particular, the transport element includes a port group with at least point-to-multipoint connectivity between the ports. For mesh topologies, multipoint-to-multipoint connectivity is provided for external point-to-multipoint connectivity. Accordingly, the transport element is externally represented as a router or switch and channelization required on the physical ports is minimized.

This reduces cost in terms of support and equipment in the transport network and in subtending network elements.

Still another technical advantage of the present invention includes providing secure transport elements within the transport network. In particular, the topology of the transport network is isolated from the external network. In addition, the routing models and topologies of a transport element is known only to ports of the transport element, and thus hidden from other transport elements in the network. As a result, the transport elements are isolated from one another to prevent cross contamination and intrusions between the elements and customers. Thus, the value of transport elements is increased for both customers and network owners.

Still another technical advantage of the present invention includes providing an improved architecture for nodes in the transport network. In particular, the transport nodes comprise modular building blocks to support a scalable, pay-as-you-grow, architecture. In addition, functionality of the transport elements is distributed between nodes to allow any processor in the transport network to control the element. The control processor for a transport element generates routing information for the element and distributes it to the ports of the element for traffic processing.

Still another technical advantage of the present invention includes providing a transport network and transport elements with high bandwidth efficiency. In particular, optical links are provided between ports of the transport elements in the network. Internet protocol (IP) and other packets are transported directly on the optical links using only a limited or thin transmission protocol. Accordingly, bandwidth use is maximized in the transport network and the cost of the network is minimized.

Still another technical advantage of the present invention includes providing an improved transport router, transport Ethernet switch, and transport Frame Relay switch with geographically distributed ports. The transport router includes a port group providing point-to-multipoint connectivity between a set of subtending IP routers. The transport Ethernet switch includes a port group providing point-to-multipoint connectivity between a set of subtending Ethernet switches. The transport Frame Relay switch includes a port group providing point-to-multipoint connectivity between a set of subtending Frame Relay switches. In addition, port groups may transparently interconnect any other suitable external ports, in which case the port group may be user protocol independent.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 9 is a flow diagram illustrating a method for provisioning an IPT network in accordance with one embodiment of the present invention;

FIG. 10 is a flow diagram illustrating a method for defining a transport router in an IPT network in accordance with one embodiment of the present invention;

FIG. 11 is a flow diagram illustrating a method for generating routing tables for a transport router in accordance with one embodiment of the present invention; and FIG. 12 is a flow diagram illustrating a method for processing through traffic in a transport router in accordance with one embodiment of the present invention.

DETAILED DESCRIPTION OF THE INVENTION

Figure 1:
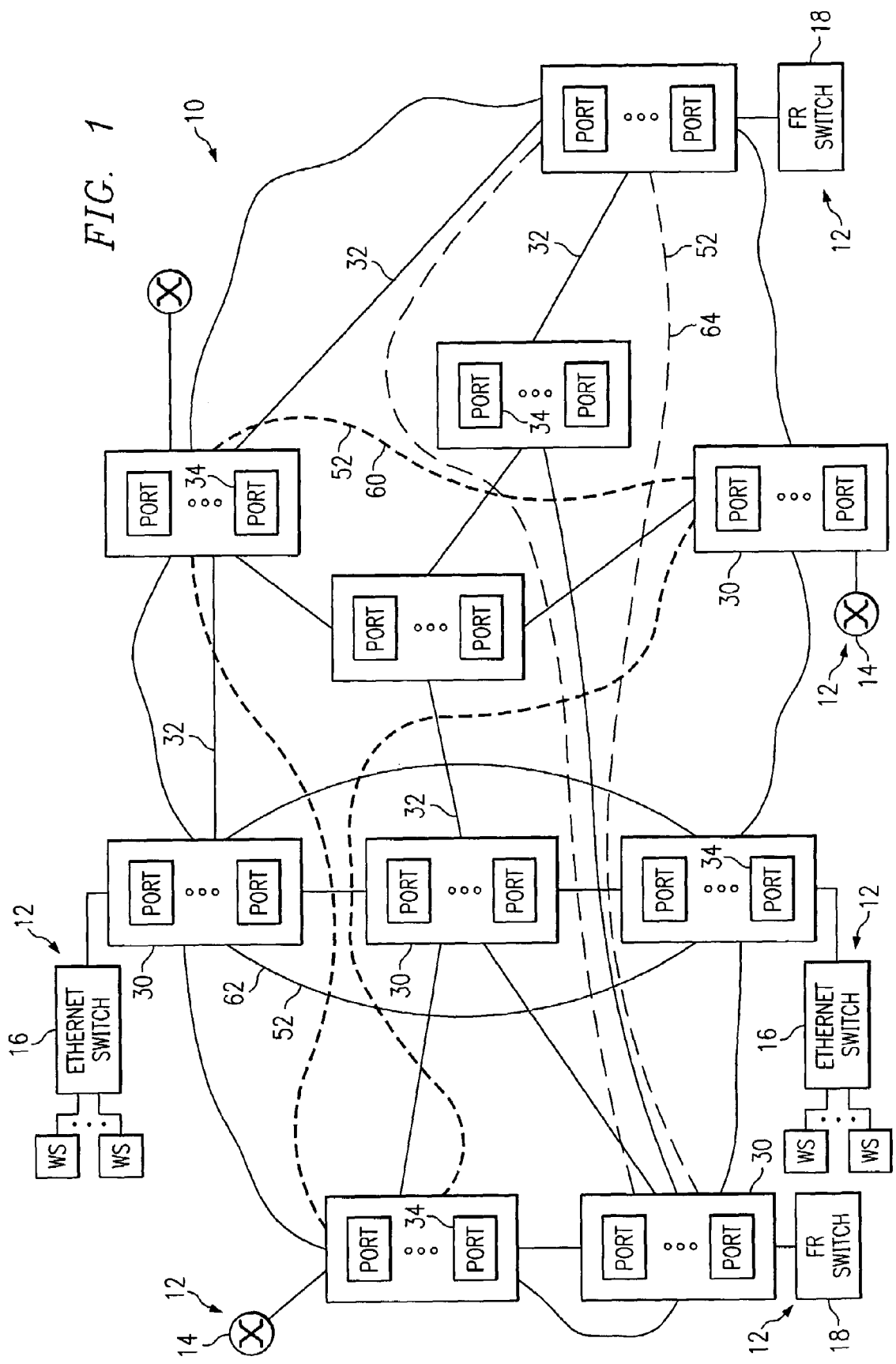
FIG. 1 is a block diagram illustrating a transport network in accordance with one embodiment of the present invention.

FIG. 1 illustrates a transport network 10 in accordance with one embodiment of the present invention. In this embodiment, the transport network 10 is an Internet protocol (IP) network for transporting IP and Multiple Protocol Label Switch (MPLS) packets. The transport network 10 may be any other packet-switched network operable to route, switch, and/or otherwise direct data packets based on network protocol addresses.

The transport network 10 is a private network connecting geographically distributed segments of an external network 12. The external network 12 includes one or more public and/or private networks such as the Internet, an intranet, and other suitable local area networks (LAN), wide area networks (WAN), and nodes. The external network 12 includes label switch and subtending routers 14, Ethernet switches 16, Frame Relay switches 18 and other suitable routers, switches, and nodes operable to generate and/or transport traffic. The transport network 10 communicates with nodes of the external network 12 in the native protocol of the nodes to communicate traffic and control signaling between the networks 10 and 12.

Referring to FIG. 1, the transport network 10 includes a plurality of Internet protocol transport (IPT) nodes 30 interconnected by communication links 32. The IPT nodes 30 each include a plurality of ports 34 accessible to the external network 12. As used herein, each means every one of at least a subset of the identified items. The communication links 32 are optical fiber or other suitable high-speed links. The high-speed links are operable to transport traffic at a rate of 5 Gb/s or greater. Preferably, the high-speed links 32 transport traffic at rates of 10 Gb/s or above.

As described in more detail below, the high-speed links 32 connect high speed interfaces of the IPT nodes 30 to form fast transport segments (FTS) through the transport network 10. Packets transferred via the FTSs incur very small buffering delay in the network as described in co-owned U.S. patent application entitled "Method and System for Transporting Traffic in a Packet-Switched Network", filed Jun. 6, 2000. Packets carried through the ports 34 and between FTSs may incur queuing delay comparable to a normal IP switch.

To optimize bandwidth usage within the transport network 10, packets may be transmitted directly on the high-speed optical links 32 without synchronous optical network (SONET) framing and its associated overhead which imposes a penalty of three to five percent depending on the line rate. In one embodiment, a transport label is added to each packet to generate an internal packet that can be directly transmitted on the optical links 32. Details of the transport label are described in co-owned U.S. patent application entitled "System and Method for Connectionless/Connection Oriented Signal Transport", filed Jun. 6, 2000. Using the transport label, both connection-oriented and connectionless traffic may be seamlessly transported across the transport network 10. Protection for connection oriented data flows may be provided as described in co-owned U.S. patent application entitled "Method and System For Providing A Protection Path For Connection-Oriented Signals In A Telecommunications Network", filed Jun. 6, 2000. Protection for connectionless, packet transport, traffic flows may be provided as described in co-owned U.S. Patent Application "Method and System For Providing A Protection Path For Connectionless Signals In A Telecommunications Network", filed Jun. 6, 2000.

To support voice, video, and other real-time or time-sensitive applications, the transport network 10 may provide class of service (CoS) capabilities. In one embodiment, all IP packets are mapped to one of three priority levels as they enter the transport network 10. In this embodiment, guaranteed traffic has reserved bandwidth and is guaranteed to be transported within a defined time delay. Control flow traffic is also reserved and guaranteed, but the network 10 does not guarantee delivery time delay. Best effort traffic does not have reserved bandwidth and delivery is not guaranteed by the network 10. By distinguishing and prioritizing traffic based on its type, including CoS, service level agreement (SLA) and/or other suitable indication of importance or delivery constraints. The transport network 10 is able to deliver time-sensitive traffic within tight time constraints by delaying and/or dropping best effort traffic and other low priority traffic.

In one embodiment, the transport network 10 utilizes a private internal addressing scheme to isolate the network 10 from customers and thus minimize or prevent conflicts with private and/or public networks connected to the transport network 10. This reduces the complexity of network management and preserves the topology of the existing routed network 12. In addition, transport network isolation enables value added services to be provided through the transport network 10.

When an independent addressing scheme is utilized for the transport network 10, egress traffic is converted from the external addressing scheme to the internal addressing scheme at ports 34 using standardized or extended network address translation (NAT). Similarly, egress traffic is converted from the internal addressing scheme back to the external addressing scheme at ports 34 using standard or extended NAT. In addition to the internal addresses, each IPT node 30, port 34 and other component of the transport network 10 visible to the external network 12 includes a globally unique IP address. These addresses are used for external management of the transport network 10.

The transport network 10 provides a flexible topology in which sets of ports 34 may be grouped in any suitable way and each treated as a single entity capable of independently interacting with external nodes. Thus, the transport network 10 is externally represented as sets of port groups 50 with internally managed connectivity. Provisioning of port groups 50 in the transport network 10 is unconstrained with mesh and partial-mesh topologies supported.

The port groups 50 are each a set of ports 34 with similar routing properties. In particular, a port group 50 is a set of ports 34 configured to provide multipoint-to-multipoint or at least point-to-multipoint connectivity between one another which allows point-to-multipoint connectivity between external elements. Accordingly, traffic received by a port group 50 can be routed directly from an ingress port 34 to a plurality of egress ports 34 without channelization in the transport network 10.

Port groups 50 may be provisioned as simple port groups or as composite port groups. In the simple port group configuration, each port 34 only belongs to a single port group 50. Private addresses can be supported inside the simple port group configuration. A composite port group includes ports 34 which have membership in multiple port groups 50. In the composite port group case, private IP addressing is not supported.

The port groups 50 each define a transport element 52 with geographically distributed ports 34. Each transport element 52 is assigned a unique global IP address for peering and protocol exchanges within and/or external to the transport network 10. As described in more detail below, the transport elements 52 may implement a distributed architecture in which local processors control each of the ports 34 and a centralized processor controls the network element 52.

In particular embodiments, the transport elements may be transport routers 60 interconnecting sets of subtending IP routers 14, transport Ethernet switches 62 interconnecting sets of subtending Ethernet switches 16, and transport Frame Relay switches 64 interconnecting sets of subtending Frame Relay switches 18. In addition, the transport element 52 may interconnect two ports transparently, in which case the port group 50 is user protocol independent.

Figure 2:
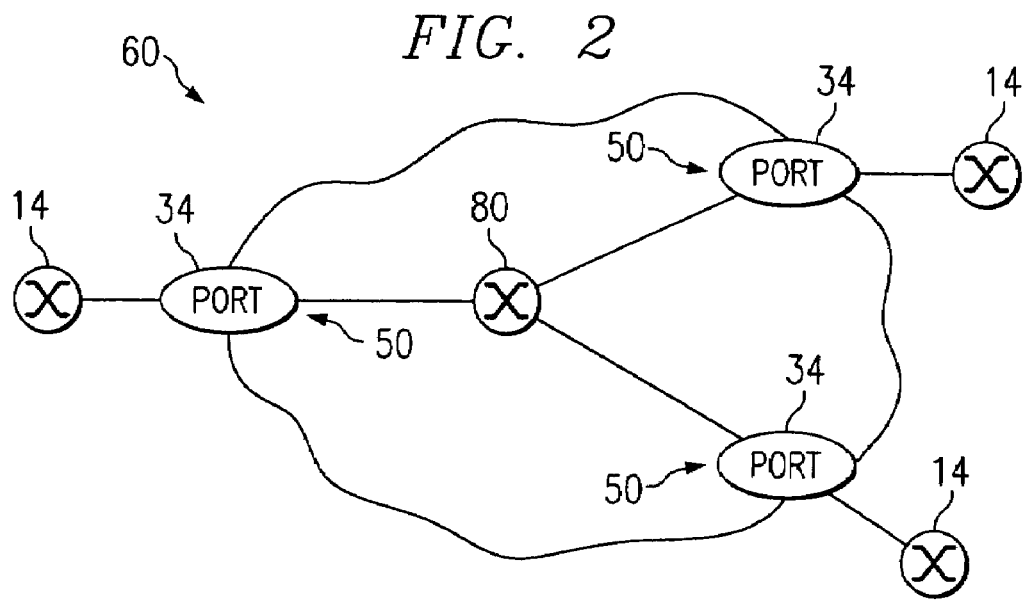
FIG. 2 is a block diagram illustrating an external representation for the transport router of FIG. 1 in accordance with one embodiment of the present invention.

FIG. 2 illustrates details of the transport router 60 in accordance with one embodiment of the present invention. In this embodiment, the transport router 60 comprises a simple port group and acts as a single network element within a customer's autonomous network.

Referring to FIG. 2, the transport router 60 includes geographically distributed ports 34 connected to external routers 14. The external ports 34 form a port group 50 with point-to-multipoint connectivity between the ports 34 as externally represented by the router 80. Accordingly, traffic from any one of the external routers 14 may be routed from an ingress port 34 directly to any number of the other external routers 14 by router 80.

The transport router 60 includes a router identifier to peer with the external routers 14 and participate in reservation and other protocol exchanges. In a particular embodiment, the transport router 60 peers with subtending routers 14 by using interior gateway protocols (IGP) such as OSPF, IS—IS, or RIP. The transport router 60 may peer using an exterior gateway protocol (EGP) or any other suitable protocol.

Figure 3:
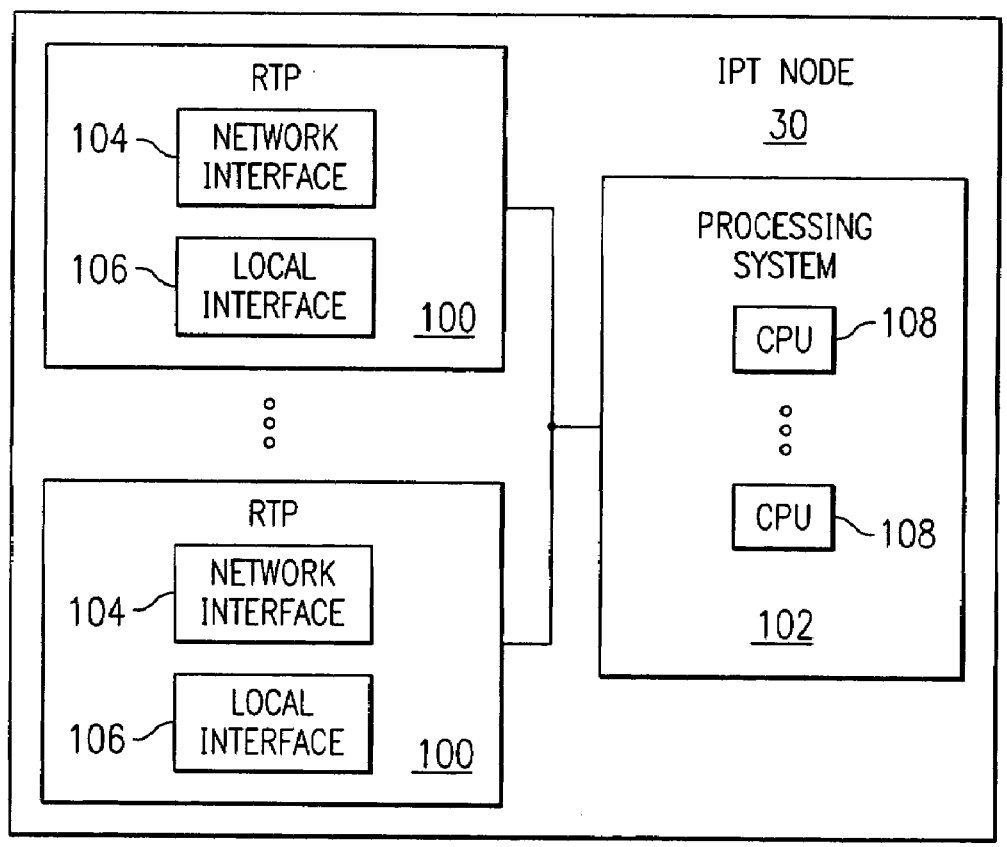
FIG. 3 is a block diagram illustrating details of the Internet protocol transport (IPT) node of FIG. 1 in accordance with one embodiment of the present invention.

FIG. 3 illustrates details of the IPT node 30 in accordance with one embodiment of the present invention. In this embodiment, the IPT node 30 comprises an add/drop multiplexer (ADM) with modular building blocks to support a scalable, pay-as-you-grow architecture. Accordingly, the transport network 10 owner may add functionality and incur cost based on customer demand.

Referring to FIG. 3, the IPT node 30 includes one or more receiver-transceiver pairs (RTP) 100 and a processing system 102 interconnected by an internal Ethernet connection. As described in more detail below, each RTP 100 includes one or more internal interfaces 104 and one or more external interfaces 106. The internal interfaces are high-speed interfaces between the IPT nodes 30 while the external interfaces 106 are low-speed ports 34 accessible to external nodes. The internal and local interfaces 104 and 106 may each be implemented as one or more discrete cards.

Within the transport network 10, a set of internal interfaces 104 of the IPT nodes 30 are connected together between ports 34 of a port group 50 to form an FTS between the ports 34 and provide multipoint-to-multipoint and/or point-to-multipoint connectivity. In particular, a multiplexer of an internal interface 104 is connected to a demultiplexer of a next internal interface 104 in the FTS while a demultiplexer of the internal interface 104 is connected to a multiplexer of a previous internal interface 104 in the FTS. The FTSs are directionally-sensitive to preferentially route pass-through traffic over local ingress traffic. In this way, traffic for a transport element 52 is transported between an ingress and egress port on an FTS with minimal delay across the transport network 10.

The processing system 102 includes one or more central processing units (CPUs) 108. The CPUs 108 may each operate the IPT node 30 or a transport element 52. A CPU 108 operating the IPT node 30 includes an operating system and control functionality for the IPT node 30. A CPU 108 operating a transport element 52 includes control functionality for the distributed components of the transport element 52.

Figure 4:
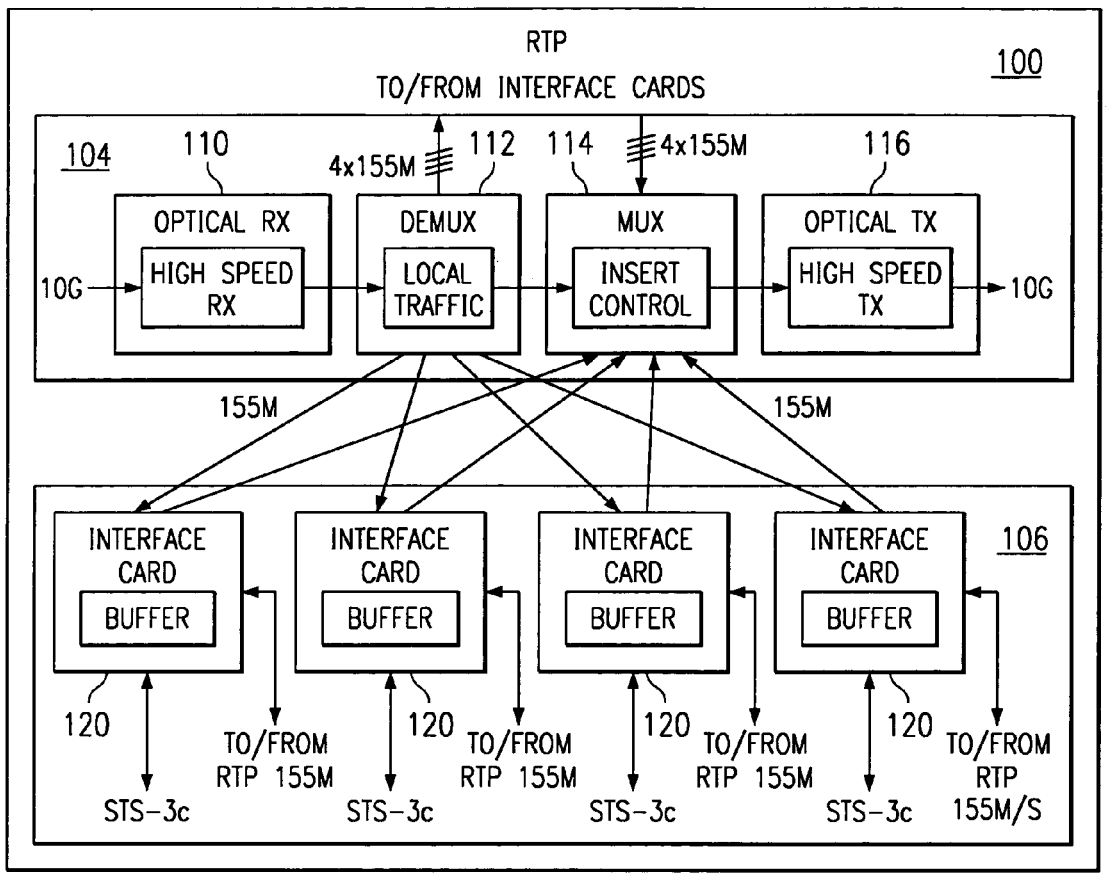
FIG. 4 is a block diagram illustrating details of the receiver-transmitter pair (RTP) of FIG. 3 in accordance with one embodiment of the present invention.

FIG. 4 illustrates details of the RTP 100 in accordance with one embodiment of the present invention. In this embodiment, the internal interface 104 is a high-speed interface that operates at substantially 10 Gb/s. The external interface 106 is a low-speed packet over SONET (POS) interface that operates at 2.5 Gb/s or below.

Referring to FIG. 4, the internal interface 104 includes an optical receiver 110, a demultiplexer 112, a multiplexer 114, and an optical transmitter 116. The optical receiver is a 10 Gb/s receiver without SONET or package level knowledge. The optical receiver 110 performs the optical to electrical signal conversion. The optical receiver 110 may include an amplifier and may directly interface with a wave division multiplex (WDM) system.

The demultiplexer 112 drops local traffic and inter RTP traffic as well as buffers transit traffic. In a particular embodiment, the demultiplexer 112 has a set of 155 Mb/s connections to interface cards of the external interface 106. The demultiplexer 112 may also have 155 Mb/s connections to interface cards of other RTPs 100.

The multiplexer 114 collects local traffic from the interface cards of the external interface 106 and through traffic from the demultiplexer 112. The multiplexer 114 includes packet buffer, scheduler and insertion control functionality.

The optical transmitter 116 is a 10 Gb/s transmitter without SONET or package level knowledge. The optical transmitter 116 may include an optical amplifier. The optical transmitter 116 performs a conversion from an electrical signal to an optical signal and may interface directly with a WDM system.

The external interface 106 include a plurality of low-speed interface cards 120. The low-speed interface cards 120 send and receive traffic to and from the multiplexer 114 and demultiplexer 112, respectively. The low-speed interface cards 120 also provide connections between the FTSs.

The low-speed interface cards 120 are the main buffering point for ingress and egress traffic of the transport network 10. Packet level intelligence, including routing and protection mechanisms, are provided by the low-speed interface cards 120. If the transport network 10 uses an isolated addressing scheme, the low-speed interface cards 120 perform NAT functionality.

Figure 5A:
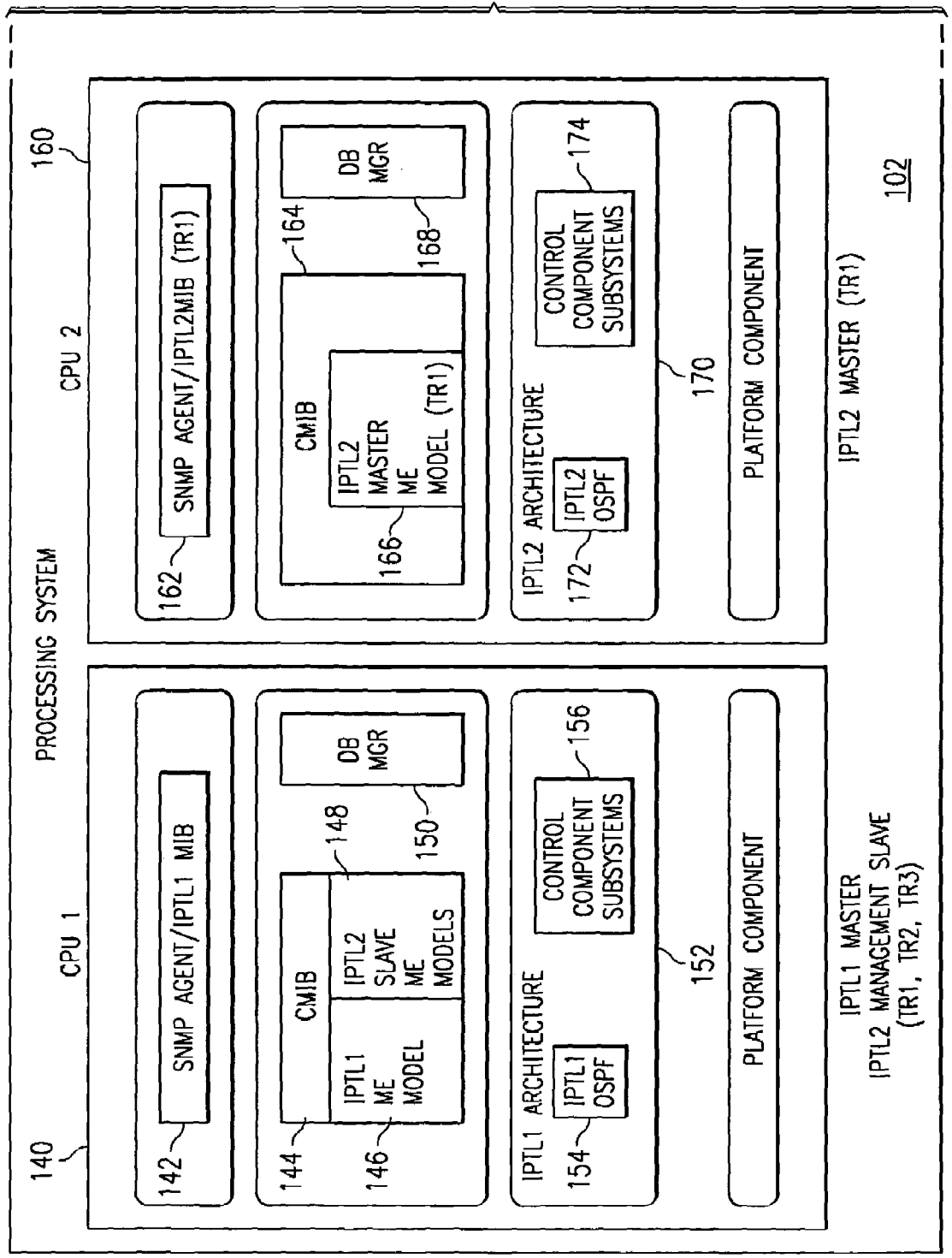
FIG. 5 is a block diagram illustrating details of the processing system of FIG. 3 in accordance with one embodiment of the present invention.
Figure 5B:
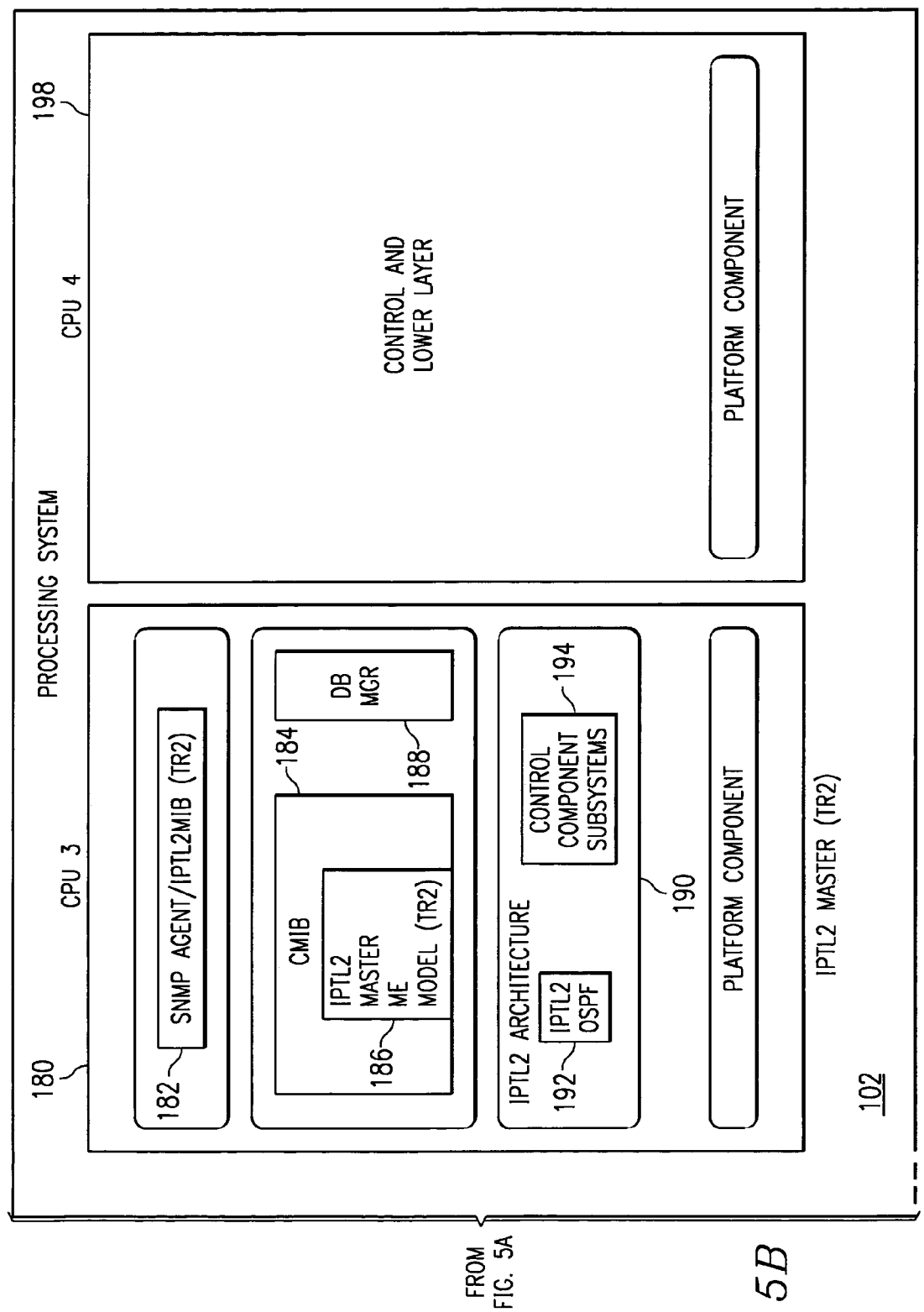

FIG. 5 illustrates details of the processing system 102 in accordance with one embodiment of the present invention. In this embodiment, the transport network 10 includes an internal (IPTL1) layer and an external (IPTL2) layer. The processing system 102 provides a distributed architecture for the transport element 52. In particular, each port 34 of a transport element 52 is locally managed with control processing performed by a centralized processor.

Referring to FIG. 5, the processing system 102 includes four CPUs 108 each configurable to operate the IPT node 30 or a transport element 52. The first CPU 140 manages the IPT node 30 and includes a simple network management protocol (SNMP) agent/internal network layer one (IPTL1) management information base (MIB) 142 for the IPT node 30. A common management information base (CMIB) 144 includes a model 146 of the transport network 10 and slave models 148 for transport elements having local ports. A database manager 150 manages the CMIB 144. An internal transport network layer one (IPTL1) architecture 152 includes an internal open shortest path first (IOSPF) instance 154 for discovery of the transport network 10. The IPTL1 architecture also includes control component subsystems 156.

The second CPU 160 is a master controller for a first transport element 52 of the transport network 10. The second CPU 160 includes an SNMP agent/external network MIB 162 for the first transport element 52. A CMIB 164 includes a master model 166 of the layer two (IPTL2) architecture for the first transport element 52. A database manager 168 manages the CMIB 166. The IPTL2 architecture 170 includes an OSPF instance 172 for discovery of the network connected to the first transport element 52. The IPTL2 architecture also includes control component subsystems 174.

The third CPU 180 is a master controller for a second transport element 52 of the transport network 10. The third CPU 180 includes an SNMP agent/external network MIB 182 for a second transport element 52. A CMIB 184 includes the master model 186 of the IPTL2 architecture for the second transport element 52. A database manager 188 manages the CMIB 184. The IPTL2 architecture 190 includes an OSPF instance 192 for discovery of the network connected to the second transport element 52. The IPTL2 architecture also includes control component subsystems 194.

The OSPF instances for each transport element discovers the topology for the element and generates the master model. The model is then distributed to the port controllers as slave models for point-to-multipoint connectivity within the port group of the transport element. The fourth CPU 198 is unassigned to a particular transport element 52 and may be idle or used to control lower layer functions.

In operation, layer one (IPTL1) learns the internal topology and does not exchange this information outside the transport network 10. The internal paths are learned using IPTL1 in order to route traffic between any two points within the network 10 regardless of the contents of the package. The traffic may be locally or externally generated. All IPT nodes 30 participate in IPTL1. Layer two (IPTL2) deals with the external topology for a transport router.

Each IPT node 30 is assigned a unique internal OSPF (IOSPF) router identifier. The transport network 10 runs IOSPF between the IPT nodes 30 to provide normal and protection paths between ingress points of the network. As a result, the transport network is modeled as a collection of routers interconnected by point-to-point links.

As described in more detail below, path label calculation (PLC) interacts with the IOSPF in order to learn the transport network 10 topology. Based on the learned topology, PLC determines the normal and protection paths. PLC also addresses overlapping paths. After PLC has learned the transport network topology, PLC signals IPTL2 to start running. When IPTL2 converges, OSPF is updated in the forwarding table for the corresponding transport element 52. PLC then populates the look-up table for the ports 34 of the transport element 52.

Figure 6A:
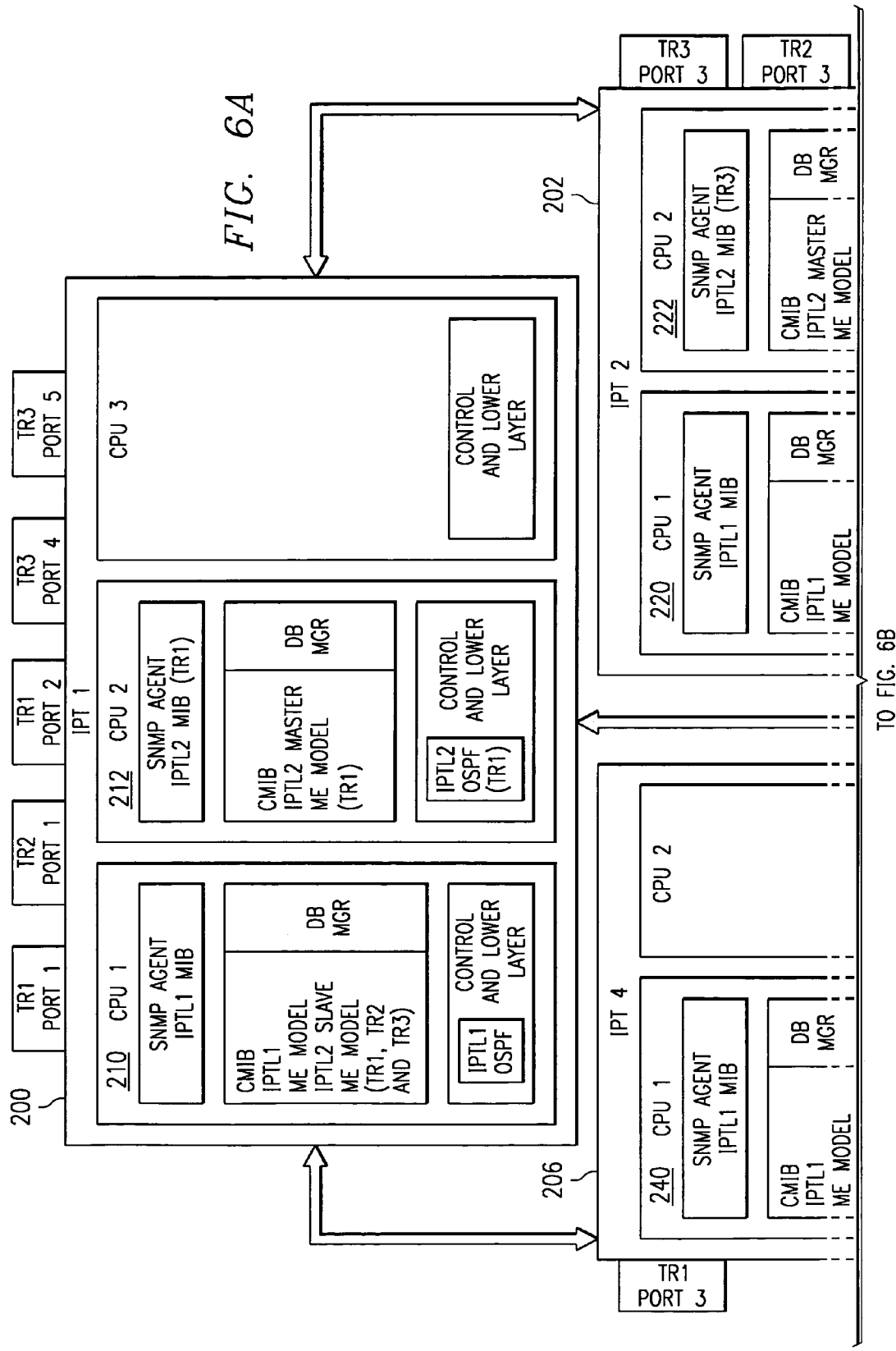
FIG. 6 is a block diagram illustrating distribution of functionality between processors in an exemplary network in accordance with one embodiment of the present invention.
Figure 6B:
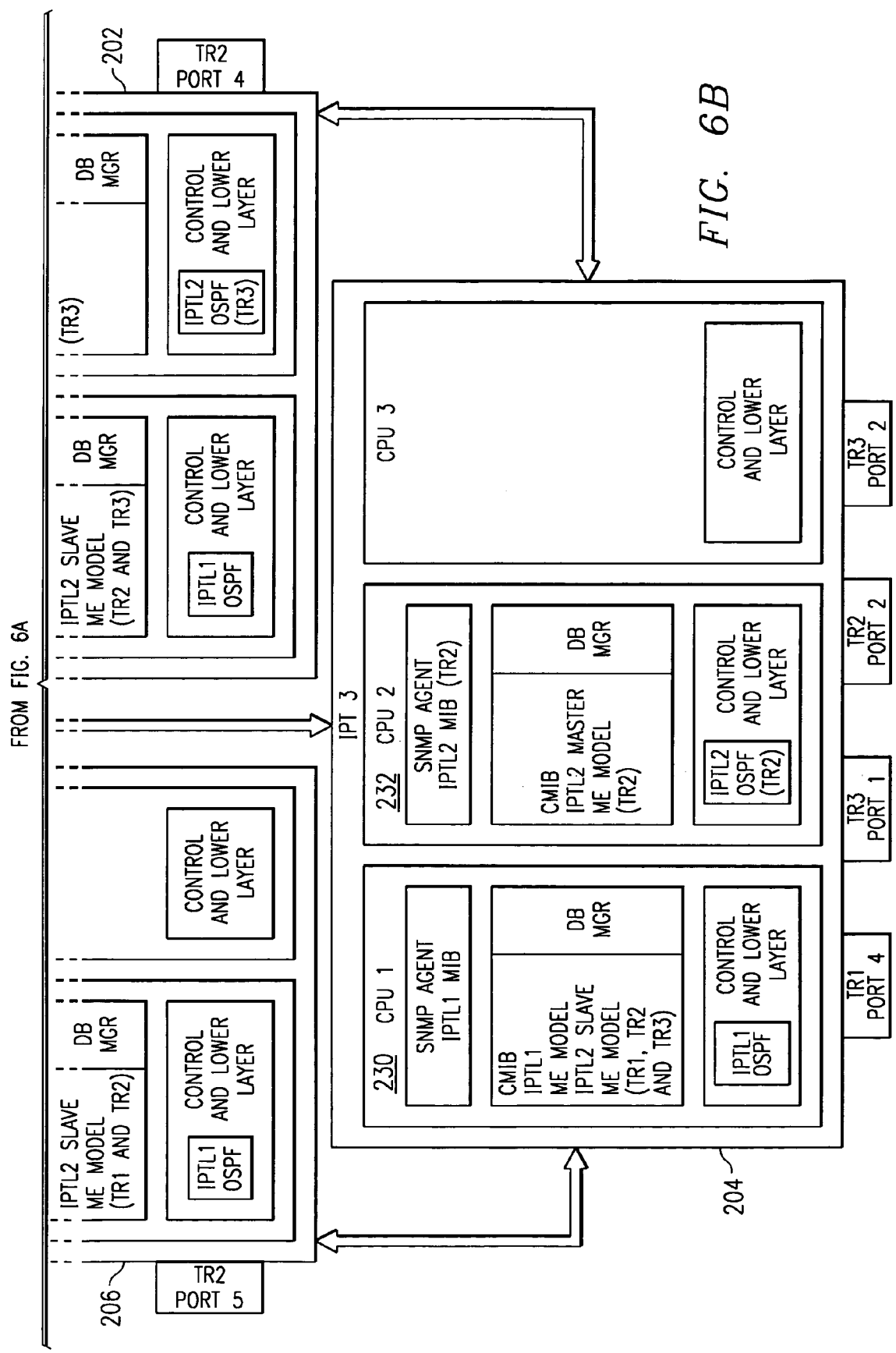

FIG. 6 is a block diagram illustrating the distributed control architecture for transportation routers 60 in an exemplary network. The exemplary network includes a first IPT node 200, a second IPT node 202, a third IPT node 204, and a fourth IPT node 206.

The first IPT node 200 includes a first and second port for a first transport router, a first port for a second transport router, and a fourth and fifth port for a third transport router. The first CPU 210 includes control functionality for the first IPT node 200 as well as slave models of the first, second, and third transport routers for controlling the local ports. The second CPU 212 is a master controller for the first transport router.

The second IPT node 202 includes a third port of the third transport router and a third and fourth port of the second transport router. The first CPU 220 includes control functionality for the second IPT node 202 and slave models of the second and third transport routers for controlling the local ports. The second CPU 222 is a primary controller for the third transport router.

The third IPT node 204 includes the fourth port of the first transport router, a second port of the second transport router, and a first and second port of the third transport router. The first CPU 230 comprises control functionality for the third IPT node 204 and slave models of the first, second, and third transport routers for managing the local ports. The second CPU 232 includes a master controller for the second transport router.

The fourth IPT node 206 includes a third port of the first transport router and a fifth port of the second transport router. The first CPU 240 includes control functionality for the fourth IPT node 206 and slave models of the second transport routers for controlling the local ports. In this way, each IPT node and ports of the IPT node are locally managed. The distributed transport elements are managed by a centralized controller on any one of the IPT nodes.

Figure 7:
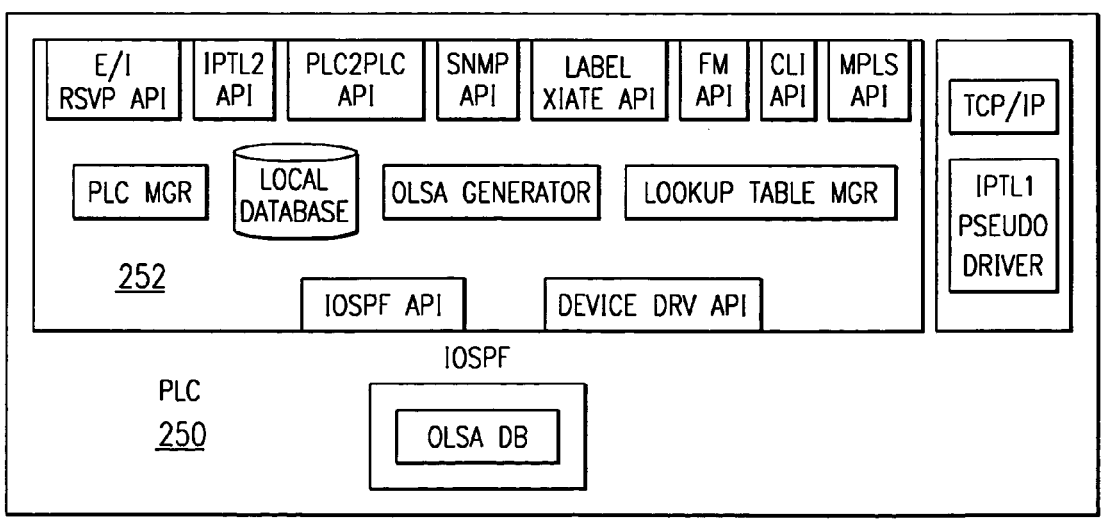
FIG. 7 is a block diagram illustrating details of the transport network layer one (IPTL1) architecture for the processing system of FIG. 5 in accordance with one embodiment of the present invention.
Figure 8:
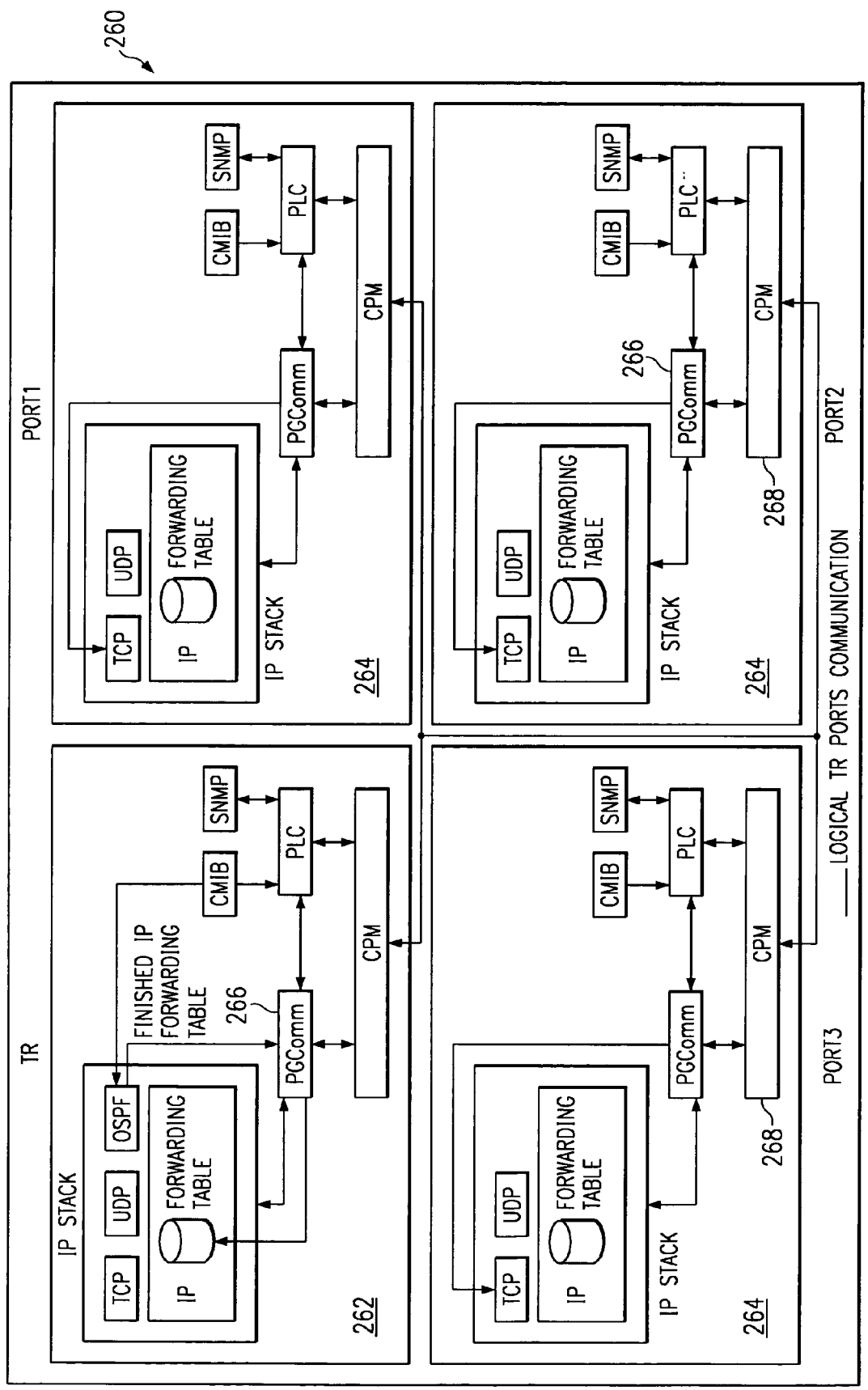
FIG. 8 is a block diagram illustrating details of the transport element layer two (IPTL2) architecture for the processing system of FIG. 5 in accordance with one embodiment of the present invention.

FIG. 7 illustrates the IPTL1 architecture 250 in accordance with one embodiment of the present invention. FIG. 8 illustrates the IPTL2 architecture 260 in this embodiment in which the transport network 10 uses a transport label to efficiently transport traffic in the network 10. OSPF uses opaque link state advertisements (OLSAs) in order to discover the external network topology.

Referring to FIG. 7, the functionality of the PLC 252 is based on whether the processor is managing an instance of IOSPF. An IPT node 30 will have only one instance of IOSPF, but each processor will have an instance of PLC 252.

The PLC 252 instance associated with IOSPF builds a local configuration database (LDB) from IPTL1 and IPTL2 provision values, creates the OLSA entry from the configuration of IPTL1, tunnels the OLSA entry to IOSPF, retrieves the OLSA database from IOSPF upon IOSPF's notification of convergence, synchronizes the OLSA database with its PLC peers within an IPT node, signals IPTL2 to start by adding the transport router's port IP address, the multicast host, and transport router's IP address to the port prefix table and adding the CPU's label to the transport table of the port. The PLC 252 also receives the IPTL2 forwarding table (IP forwarding table), populates the prefixes, the transport labels and the destinations mapping tables for the ports of the IPTL2.

The PLC 252 receives fault signal from a fault manager which indicate the link failure identifier. In response to a link failure, the PLC 252 determines which label is effected by the link failure and marks the label as invalid in the transport label's table per port. If the link identifier is local, the OLSA conveys the failure and hands failure processing over to IOSPF.

The PLC 252 also translates an internal reservation protocol (RSVP) request on a normal path. The internal RSVP specifies the ingress and egress ports. The normal path includes a control path and a data path. A control path is a list of IPT nodes 30 to be traversed from a source to a destination. The data path is a list of high speed and slow speed links to be traversed between the source and the destination. If the internal RSVP succeeds in making a reservation on the normal path, it indicates to the PLC 252 the new QoS of the path. The PLC 252 updates the QoS of the normal transport label for the port 34. The same process occurs for the protection path. If the port 34 is not local to the PLC 252, the PLC 252 tunnels the information to the PLC 252 where the port resides to do the update. Further information regarding the internal reservation process is described in co-owned U.S. patent application entitled "System and Method for Opaque Application Object Transport", filed Jun. 6, 2000.

The PLC 252 further supports a proprietary MIB for port lookup table and receives requests from MPLS. The requests include an IP destination prefix and an ingress port. The PLC 252 returns the pointers of the normal and protection transport labels and a next-hop IP address of the subtending router 14. The PLC 252 supports a device driver API to update the forwarding table in the port and supports a label translator to reach any point in the transport network 10.

The PLC 252 instance not associated with IOSPF builds a local configuration database (LDB) from IPTL1 and IPTL2 provisioned values, synchronizes the OLSA database with its IOSPF's PLC peers within an IPT node, signals IPTL2 to start by adding the transport router's port IP address, the multicast host, and transport router IP address to the port prefix table and adding the CPU's label to the transport table of the port, populates the prefixes, the transport labels, and the destinations mapping tables for the ports of the IPTL2.

The PLC 252 also receives fault signal from a fault manager which will indicate the link failure identifier. In this case the PLC 252 determines which label has been effected by the link failure and marks the label as invalid in the transport label's table per port.

The PLC 252 further translates an external IP address to IPTL2 to an egress port for external RSVP, receives signals from a PLC 252 associated with IOSPF to update the local port and receives an internal RSVP request on a normal path. As previously described, the internal RSVP will specify the ingress and egress ports. The normal path includes a control path and a data path. The control path is a list of IPT nodes 30 to be traversed from a source to a destination. The data path is a list of high speed links and low speed links to be traversed between the source and the destination. If the internal RSVP has succeeded in making reservation on the normal path, it indicates to the PLC 252 the new quality of service (QoS) of the path. The PLC 252 updates the QoS of the normal transport label for the port. The same process occurs for protection path. The PLC 252 also supports a device driver API to update forwarding table in ports and supports a label translator to reach any point in an transport network 10. To perform the necessary functions, IOSPF will include an API to permit the PLC 252 to pass the OLSA to the IOSPF, signal the PLC to retrieve OLSA database, modify OSPF link state database's structure to store and flood OLSA.

Referring to FIG. 8, the IPTL2 architecture 260 comprises the topology for the transport router 60. The transport router manages the ports 34 in its ports group 50. The subtending routers 14 view the transport router 60 as a single router. The transport router 60 reacts to both external and internal changes in topology, which triggers updates between the subtending routers 14 and the transport router 60. Changes inside the transport network 10 that do not impact the states of the port 34 are not reported to the subtending routers 14.

As previously described, a master transport router instance resides in a single processor 262 within the transport network 10. Slave processors 264 resides on each transport node 30 including a port 34 for the transport router 60. Each processor 262 and 264 associated with the transport router 60 has a port group communication module 266.

A TCP connection is established between the transport routers instance and the ports instances. This connection is used to traffic control data between the transport router 60 and the subtending routers 14. The communication instance for the transport router 60 monitors the states of the transport routers ports 34 via the TCP connection with the ports instance, downloads a forwarding table upon notification from the routers OSPF, requests from the PLC 252 to translate a port 34 to a transport label, interacts with CMP 268 to send and receive packets, and tunnels the management's control packets to the transport routers ports 34. The ports communication instance establishes TCP connections with the transport router 60, tunnels all control packets to the transport router 60, request from the PLC 252 to translate a port 34 to a transport label, receives a forwarding table from the transport router 60 and downloads a forwarding table to the PLC 252.

FIG. 9 illustrates a method for provisioning transport elements 52 in the transport network 10 in accordance with one embodiment of the present invention. The method begins at step 350 in which connections are provisioned between the IPT nodes 30. The connections define the FTSs within the transport network 10. At step 352, addresses for each transport elements 52 are defined within the address space for the IPT network 10.

Proceeding to step 354, the internal topology of the transport network is discovered. At step 356, transport elements 52 are defined within the transport network 10. The transport elements 52 each comprise a port group 50 and may be a transport router, transport Ethernet switch, or transport Frame Relay switch. At step 358, topology of the transport elements 52 and connected external nodes are discovered.

Next, at step 360, the transport elements 52 each peer with the subtending routers 14 or other external nodes. At step 362, the transport elements 52 generate routing tables for receiving and transmitting packets to and from the external network and within the transport network 10. In this way, the transport elements 52 are freely defined within the transport network 10 to match the topology of the network 10 to needs of customers.

FIG. 10 illustrates a method for defining a transport element 52 in the transport network 10 in accordance with one embodiment of the present invention. The method begins at step 400 in which a master, or primary processor for the transport element 52 is assigned within the transport network 10. As previously described, the master processor controls the transport element 52 directly and through slave processors local to each of the ports 34. Next, at step 402, ports 34 are identified and assigned to the transport element 52.

Proceeding to step 404, a local processor is assigned or otherwise provided for each port 34 of the transport element 52. In one embodiment, the local processor by default is a master processor for each corresponding IPT node 30. At step 406, an identifier is assigned to the transport element 52 to allow the transport element 52 to participate in protocol exchanges and otherwise appear as a single element to external nodes.

FIG. 11 illustrates a method for generating routing tables for a transport element 52 in accordance with one embodiment of the present invention. The method begins at step 450 in which a routing information base (RIB) is generated by a master processor for a transport element 52. The RIB is generated based on the IPTL1 and IPTL2 architectures.

At step 452, the RIB is distributed to each port 34 of the transport element 52. At step 454, a forwarding information base (FIB) is generated at each port 34 based on the RIB. The ports 34 use the RIB to process traffic received from the transport network 10 or the external network 12. Step 454 leads to the end of the process by which routing information is centrally generated and distributed for the transport element 52.

FIG. 12 illustrates a method for processing through traffic in a transport element 52 in accordance with one embodiment of the present invention. The method begins at step 500 in which an IP packet is received at an ingress port 34 of a transport element 52. At step 502, a transport label is generated based on the IP address using the FIB for the transport element 52.

Proceeding to step 504, the transport label is added to the IP packet to generate an internal packet. At step 506, the internal packet is transported to an egress port 34 of the transport element 52 on high-speed links based on the transport label.

Next, at step 508, the transport label is removed from the IP packet at the egress port 34. At step 510, the IP packet is transmitted to an external destination element. Step 510 leads to the end of the process by which IP packets are transmitted across the transport network 10 on high speed links using transport labels overhead.

Although the present invention has been described with several embodiments, various changes and modifications may be suggested to one skilled in the art. It is intended that the present invention encompass such changes and modifications as fall within the scope of the appended claims.

What is claimed is:

1. A transport element, comprising:
  a port group comprising a plurality of geographically distributed ports;
  point-to-multipoint connectivity between the ports;

an identifier operable to represent the port group as a single element to disparate elements and associated with a single IP address;

a primary processor operable to generate routing information for the transport element and to distribute the routing information to the ports in the port group for traffic processing, the routing information comprising a routing information base (RIB); and a secondary processor for each port in the port group, the secondary processor operable to receive the RIB from the primary processor and to generate a forwarding information base (FIB) for the port based on the RIB.

2. The transport element of claim 1, wherein the transport element is defined in a transport network, the identifier operable to represent the port group as a single element to an external node outside the transport network.

3. The transport element of claim 2, wherein the port group is operable to participate with the external node in protocol exchanges.

4. The transport element of claim 1, wherein the transport element comprises a transport router interconnecting a set of subtending Internet protocol (IP) routers.

5. The transport element of claim 1, wherein the transport element comprises a transport Ethernet switch interconnecting a set of subtending Ethernet switches.

6. The transport element of claim 1, wherein the transport element comprises a transport Frame Relay switch interconnecting a set of subtending Frame Relay switches.

7. The transport element of claim 1, wherein the port group is user protocol independent and transparently interconnects a plurality of external ports of an external network.

8. The transport element of claim 1, wherein the transport element is unaware of an internal topology of the transport network outside of the transport element.

9. The transport element of claim 1, further comprising a set of high-speed links directly connecting the ports of the port group.

10. The transport element of claim 1, further comprising multipoint-to-multipoint connectivity between the ports.

11. The transport element of claim 1, further comprising each port operable to receive Internet protocol (IP) packets, to add an internal transport overhead to the IP packet to generate an internal packet, and to transmit the internal packet directly on an optical link to an egress port in the port group.

12. The transport element of claim 1, further comprising the geographically distributed ports connected in a non-ring topology.

13. A transport network, comprising:

a plurality of geographically distributed nodes;

each node including a plurality of ports;

a plurality of transport elements, each transport element including a port group having a plurality of ports from the geographically distributed nodes and associated with a single IP address, each transport element comprising:

a primary processor operable to generate routing information for the transport element and to distribute the routing information to the ports in the port group for traffic processing, the routing information comprising a routing information base (RIB); and a secondary processor for each port in the port group, the secondary processor operable to receive the RIB from the primary processor and to generate a forwarding information base (FIB) for the port based on the RIB;

point-to-multipoint connectivity between the ports of the port groups of the transport elements; and each transport element unaware of topologies of the other transport elements in the transport network.

14. The transport network of claim 13, further comprising an internal address space for the transport network independent from an external network.

15. The transport network of claim 13, further comprising an identifier operable to represent each port group as a single element within the transport network and external to the transport network.

16. The transport network of claim 13, further comprising software stored on computer-readable media, the software operable to selectively define the point-to-multipoint connectivity between the ports of the port groups.

17. The transport network of claim 13, further comprising an identifier operable to represent each port group as a single element to an external node, each port group operable to use the identifier to participate with the external node in protocol exchanges.

18. The transport network of claim 13, further comprising each transport element unaware of an internal topology of the transport network outside of the transport element.

19. The transport network of claim 13, further comprising a set of high-speed links directly connecting the ports of at least one port group.

20. The transport network of claim 13, further comprising multipoint-to-multipoint connectivity between the ports of at least one port group.

21. The transport network of claim 13, further comprising each port of at least one port group operable to receive Internet protocol (IP) packets, to add an internal transport overhead to the IP packet to generate an internal packet and to transmit the internal packet directly on an optical link to an egress port in the port group.

22. The transport network of claim 13, further comprising the ports in at least one port group connected in a non-ring topology.

23. A method for provisioning a transport element in a transport network, comprising:

defining at least one port group in the transport network, the port group comprising a plurality of ports from geographically distributed nodes of the transport network;

defining point-to-multipoint connectivity between the ports in the port group;

representing the port group as a single entity to an external network and associated with a single IP address; and defining the transport element in a transport network including a plurality of transport elements, the transport element unaware of topologies of the other transport elements in the transport network, the transport element comprising:

a primary processor operable to generate routing information for the transport element and to distribute the routing information to the ports in the port group for traffic processing, the routing information comprising a routing information base (RIB); and a secondary processor for each port in the port group, the secondary processor operable to receive the RIB from the primary processor and to generate a forwarding information base (FIB) for the port based on the RIB.

24. The method of claim 23, further comprising:

discovering a topology of the port group; and generating routing information based on the topology of the port group to define the point-to-multipoint connectivity between ports of the port group.

25. The method of claim 24, further comprising:

generating the routing information at a centralized location for the port group; and distributing the routing information to each of the ports in the port group.

26. The method of claim 23, wherein the transport element is a transport router and the identifier comprises a router identifier.

27. The method of claim 26, further comprising peering the transport router with subtending routers.

28. The transport element of claim 1, wherein the transport element is defined in a transport network including a plurality of transport elements, the transport element unaware of topologies of the other transport elements in the transport network.

* * * * *

UNITED STATES PATENT AND TRADEMARK OFFICE
CERTIFICATE OF CORRECTION

| | | |
|---|---|---|
| PATENT NO. | : 7,133,403 B1 | Page 1 of 1 |
| APPLICATION NO. | : 09/588806 | |
| DATED | : November 7, 2006 | |
| INVENTOR(S) | : Li Mo et al. | |

It is certified that error appears in the above-identified patent and that said Letters Patent is hereby corrected as shown below:

On Title Page 4, Item (56) Other Publications, Right Column, Line 1, after "draft-ietf-" delete "tweg" and insert -- tewg --.

Signed and Sealed this

Twenty-third Day of December, 2008

JON W. DUDAS
*Director of the United States Patent and Trademark Office*